March 15, 1966   M. J. PRYOR ETAL   3,240,629
PRIMARY CELL
Filed Aug. 27, 1963
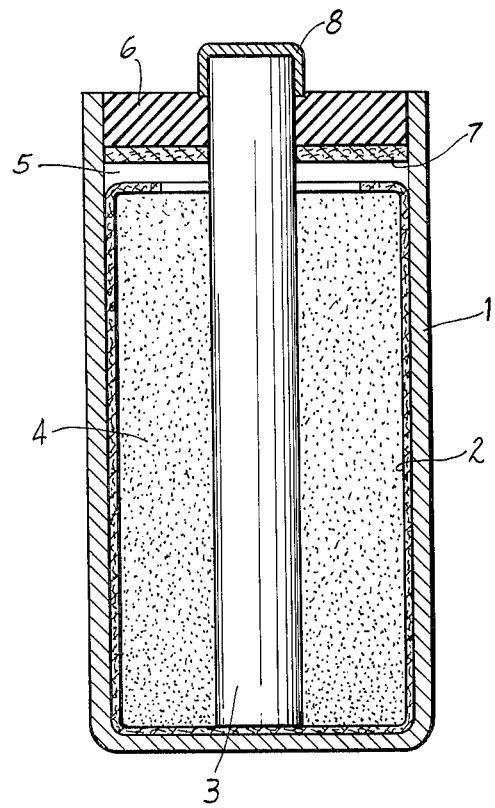
INVENTORS
MICHAEL J. PRYOR
DOUGLAS S. KEIR
PHILIP R. SPERRY
Robert H. Bachman
ATTORNEY

United States Patent Office 3,240,629
Patented Mar. 15, 1966

3,240,629
PRIMARY CELL
Michael J. Pryor and Douglas S. Keir, Hamden, and Philip R. Sperry, North Haven, Conn., assignors to Olin Mathieson Chemical Corporation
Filed Aug. 27, 1963, Ser. No. 304,923
8 Claims. (Cl. 136—100)

This is a continuation-in-part of United States patent application Serial No. 60,166, filed October 3, 1960, now United States Patent 3,180,728, United States patent application Serial No. 171,114, now United States Patent 3,186,836, filed February 5, 1962 and United States patent application Serial No. 251,024 now United States Patent 3,189,486, filed January 14, 1963.

The present invention relates to primary cells of the "dry" type, and more particularly, to an aluminum base alloy as an anode thereof, said anode also serving as the container for the cell.

The metal zinc is extensively employed as anode in the construction of dry cells, for example, flashlight batteries. Numerous proposals have been made heretofore to substitute aluminum for zinc as the anode material in order to utilize the numerous advantageous properties of the aluminum, for example, aluminum generally attains a higher anodic efficiency than zinc, and has much higher coulombic output per unit mass of anode metal consumed. In addition, aluminum enjoys a greater ease of fabrication to thin gauge and to formed dry cell battery cases. Still further, aluminum has a generally higher corrosion resistance when the battery is on open circuit.

Dry cells containing aluminum, aluminum-zinc alloys or aluminum base alloys in general as the anode material have, however, suffered from numerous significant disadvantages, for example, such cells generally require a considerable elapsed time for the cell current to reach its steady maximum value, especially if the cell is kept on the shelf for extended periods of time. This elapsed time prevents the highly desirable quick response for current when the cell is placed in a circuit. In addition, aluminum and aluminum base alloys generally suffer from perforation of the cell wall either during service or during storage if, for example, the common halides are used as the electrolyte. Furthermore, composite alloys utilized to overcome the foregoing disadvantages are not entirely satisfactory and are more expensive.

It is therefore an object of the present invention to provide an improved primary cell of the dry type.

It is a further object of the present invention to provide an improved primary cell as above utilizing an aluminum base alloy as the anode which also serves as the container for the cell.

It is a further object of the present invention to provide a primary cell of the dry type as above which enjoys the natural benefits of aluminum as the anode material while overcoming the heretofore suffered disadvantages in the use of this material.

It is an additional object of the present invention to provide a primary cell which is capable of galvanic currents of the same order of magnitude as those produced by zinc and which is also capable of higher galvanic currents, if desired.

It is a further object of the present invention to provide a primary cell of the dry type as above which is capable of quick response for current when placed in the circuit despite extended storage periods and also which does not suffer perforation of the cell wall during storage or during service.

Further objects and advantages will appear hereinafter.

The figure is a diagrammatic view, partly in section, illustrating a dry cell structure embodying the present invention.

In accordance with the present invention it has now been found that the foregoing objects and advantages may be readily accomplished and a primary cell of the dry type obtained, said cell comprising a cathode, preferably a conventional cathodic depolarizer, an electrolyte and an aluminum base alloy container as the anode, said alloy containing at least 90 percent aluminum and between 0.01 and 0.5 percent tin, wherein the tin is preferably retained in solid solution in an amount of from 0.01 to 0.06 percent.

The improved aluminum base alloy of the present invention contains tin in an amount from 0.01 to 0.5 percent and at least 90.0 percent aluminum, and preferably at least 95 percent aluminum. The tin is retained in solid solution to the minimum degree, i.e., only in sufficient amount to yield the desired range of current density and preferably in the range of 0.02 to 0.05 percent, with the excess tin, or a suitable third ingredient being provided as taught in the above-identified co-pending application S.N. 60,166 to improve uniformity of corrosion and to improve anodic efficiency.

The preferred manner of preparing this alloy is to heat an aluminum tin alloy containing from 0.04 to 0.5 percent tin at a temperature from 150 to 540° C. In this temperature range the solid solubility of tin in aluminum is from about 0.05 to less than 0.02 percent. The time of heating is for a sufficient period of time to precipitate any excess tin from solid solution and to develop the particular form which produces maximum uniformity of attack and power efficiency. Generally, the heating period within the preferred temperature range is at least 15 minutes and may vary between 15 minutes and 48 hours. Longer times may be used but no particular advantage is thereby obtained. After the heating period, the sample may be cooled rapidly or slowly. For simplicity, this treatment may be termed "heterogenization treatment."

If desired, the heterogenization treatment may be combined with fabrication procedures, such as hot working or annealing.

The heterogenization treatment may be preceded by a homogenization treatment, described in detail in copending application Serial No. 60,166. The homogenization treatment is intended to retain the maximum amount of tin in solid solution, i.e., up to 0.1 percent, by heating at a temperature of around 620° C. ± 20° C. and then rapidly cooling. The homogenization treatment also serves to give a uniform distribution of the tin throughout the alloy. The heterogenization treatment which follows serves to reduce the tin in solid solution to levels acceptable for the dry cell application.

In accordance with the present invention it has been found that by utilizing the aluminum base alloy of the present invention as the anode, that is, as the cell container, a greatly improved dry cell is obtained.

The alloy of the present invention contains from 0.01 to 0.5 percent tin. The preferred tin content varies with the means used for control of the amount of tin remaining in solid solution within the broad limits of 0.01 to 0.06 percent. If no heterogenizing treatment is to be used, the preferred tin content is from 0.01 to 0.06 percent. Alternatively, the preferred tin content in solid solution may be maintained by the use of other alloying additions which serve to reduce the solid solubility of tin in aluminum, i.e., no heterogenizing treatment may be used and amounts of tin in excess of 0.06 percent employed while still retaining preferred solid solution levels provided that the appropriate alloying addition is employed to reduce the solid solubility of tin in aluminum. Specific alloying additions will be elaborated upon hereinafter.

High purity aluminum may be employed; however, high purity aluminum is much less economical than commercial and lower purity compositions which generally fulfill the same requirements. Therefore, it is preferred in the present invention to utilize lower purity aluminum, i.e., an alloy containing from 0.001 to 0.05 percent silicon and from about 0.001 to 0.1 percent iron. This lower purity composition may be substituted for the high purity one without detriment to the electrochemical characteristics.

It should be further understood that the alloy of the present invention may contain in addition to the aluminum and tin and the impurities, other metal components. These additional components may be added to achieve particularly desirable results.

Generally, insoluble elements may be added to the alloy, i.e., elements which have less than 0.03 percent solid solubility in aluminum at 620° C. The total amount of these insoluble elements should preferably be no greater than 0.5 percent. Examples are iron, nickel and cobalt. These insoluble elements have very little or no significant effect on current output as they do not reduce the sold solubility of tin in aluminum, but they act as second phase particulate cathodes and large amounts ultimately reduce anodic efficiency by promoting local corrosion of the anode.

Soluble elements may be also added to the alloy, i.e., elements which have greater than 0.03 percent solid solubility in aluminum. The soluble elements may be considered either lattice expanders or lattice contractors, i.e., ternary addition elements which either expand or contract the aluminum lattice. Generally the lattice expanders stabilize tin in retained solid solution and permit high galvanic currents to be drawn from the alloy. Therefore, since it is necessary to moderate the high galvanic current of the alloy of the present invention when it is utilized as the anode for a dry cell, it is not desirable to utilize large amounts of lattice expanders unless they are required for other purposes, such as strengthening the alloy, improving the castability or increasing galvanic efficiency, in which case their effect upon galvanic current may be counteracted by heterogenization treatment or by other alloying additions. Typical lattice expanders include, for example, magnesium, zirconium, gallium, bismuth and indium. Only small amounts of these materials should be used.

Lattice contractors generally reject tin from solid solution and have a moderating effect on the galvanic current. Therefore, it is desirable to utilize these lattice contractors, especially where no heterogenization treatment is used and tin in excess of 0.06 is used. Naturally, the amount of lattice contractor will vary in each particular case, but generally in an amount from 0.005 to 4 percent is used. Typical lattice contractors and representative amounts thereof include, for example, zinc from about 0.01 to 1 percent, copper from about 0.01 to 1 percent, silicon from about 0.01 to 1 percent, manganese from about 0.01 to 1 percent, silver from 0.01 to 1 percent and mixtures thereof.

Those elements most effective in moderating overly aggressive cell currents and preferred amounts thereof are: silver in at least 0.1 percent; zinc in at least 0.02 percent; copper in at least 0.01 percent; and silicon in at least 0.1 percent.

Any suitable cathode may be employed in the dry cell of the present invention, for example, the conventional carbon or graphite cathodes may be utilized. These are usually used with a conventional cathodic depolarizer, such as manganese dioxide.

The various electrolytes suggested in the art for use in dry cells may be conveniently used in the primary cell of the present invention, for example, the chloride paste electrolytes conventionally used in dry cells are perfectly suited for use in combination with the aluminum base alloy of the present invention. The chloride paste electrolytes when utilized in the dry cell of the present invention surprisingly do not result in perforation of the cell wall either during service or during storage. This is a significant advance of the present invention.

Referring to the figure, which illustrates an embodiment of the present invention, outer shell 1, which is the aluminum-tin alloy of the present invention is lined with an inert, permeable, porous separator 2, the top edge of which may be crimped inwardly to assist in retaining the paste in position. The porous layer serves to prevent direct contact of the mix with the shell yet is permeable to the electrolyte. A conventional carbon rod 3 centrally disposed in the shell is the cathode. Between the porous separator and the carbon rod is the paste 4 containing the electrolyte, depolarizer, and finely divided carbon. Above the paste is a space 5 which can accommodate any expansion of the paste that may occur without rupturing the cell wall or top seal. The cell is sealed by a suitable plastic or resinous substance 6 in association with a fibrous separator 7. The carbon rod 3 is provided with a conventional metal cap 8 to insure good electrical contact with another metallic conductor.

It is a further significant advantage of the present invention that when the alloy of the present invention is utilized for the anode material it is unnecessary to employ composite container materials to overcome the disadvantages of perforation of the cell container by localized corrosion. These composite container materials have been frequently employed heretofore in order to enable the use of an aluminum alloy as the anode. It is highly desirable to avoid the use of these composite materials especially because of the added cost of manufacture and still attain the advantages rendered therein. It has been found in accordance with the present invention that it is unnecessary to utilize composite container materials in view of the surprising advantages inherent in the aluminum base alloy of the present invention.

The present invention and the improvements attained thereby will be more readily apparent from a consideration of the following illustrative examples.

*Example 1*

This example describes representative preparation of aluminum alloys with tin contents of 0.02, 0.04, 0.08, 0.12 and 0.20 percent. The aluminum used was at least 99.995% pure to which pure tin was added and stirred in while the aluminum was in the molten condition. Each alloy was cast into a rectangular steel mold coated on the inside with pure lime.

In this example, a block, 3 x 3 x 0.85 inches was cut from each ingot after the ingots had been homogenization heat treated for 16 hours at 620° C. and cooled in air. Each block was alternately cold rolled to give reductions in thickness of about 35 percent, followed by intermediate annealing for one hour at 500° C., until a final thickness of 0.060 inch was reached. Final heat treatment consisted of heating at 620° C. for 8 hours, quenching in water, and heterogenizing by subsequent heating at 400° C. for 24 hours and quenching in water. For each of these alloys the tin content in solid solution was in the range of 0.01 to 0.06 percent.

The above example describes only one of many fabrication sequences which have been successfully used to produce rolled sheet, including the use of hot rolling to produce a substantial reduction in thickness prior to the use of cold rolling, and also including the use of intermediate anneals to furnish the heterogenizing heat treatment.

*Example 2*

A test cell was prepared in order to test the galvanic characteristics of the foregoing alloys. The cell used consisted of 10 square cm. of surface area of the desired aluminum alloy as anode and an equal area of steel as cathode, with a 0.1 N sodium chloride electrolyte, as described in an article in the Journal of the Electrochemical Society, volume 105, No. 11, starting at page 629 and also as described in co-pending patent applications Serial No. 60,166, Serial No. 171,114 and Serial No. 251,024, above-identified. This representative cell demonstrates the dry cell behavior to be expected of the anode alloy in a wide variety of chloride electrolytes.

*Example 3*

A test cell was set up in accordance with Example 2 utilizing the alloys prepared in Example 1. The cell with these alloys began to produce a current as soon as the external circuit was closed. Also, dissolution of the rolled anode alloys according to this invention occurred uniformly over the surface during the period of operation of the cell, and there was negligible local corrosion of the anode alloys during periods of open circuit. Comparatively, an aluminum-one percent zinc alloy failed to produce current as soon as the external circuit was closed, did not dissolve uniformly and attained significant local corrosion.

*Example 4*

A dry cell was prepared in a manner after the figure using an aluminum-tin alloy containing 0.12 percent tin and normal iron and silicon impurities. The alloy was prepared in accordance with the teachings of Example 1 to insure the tin in solid solution in the preferred range. The same excellent results were obtained as in Example 3.

*Example 5*

This example illustrates the use of an impurity element or an intentionally added alloying element to moderate the current output. In this case, aluminum alloys containing 0.12 percent tin and about 0.05 percent iron with the moderating element silicon varying in the range of 0.05 to 0.30 percent. Within this range, upon setting up the test cell of Example 2, the number of coulombs passed in 48 hours declined from 500 at the lowest silicon content to 30 at the highest silicon content. All alloys had first been homogenized to place the maximum amount of tin in solid solution. Thus, it was proved that a low level of current output, suitable for use in a dry cell circuit, can be obtained by suitable choice of a third element in the aluminum-tin alloy. A further demonstration of this effect was found in a high purity aluminum-0.20 percent tin alloy with silver additions in the range of 0.01 to 0.09 percent. At the lowest silver content the coulombs passed in 48 hours amounted to 1,000, whereas, at the highest silver content it was reduced to 100.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A primary cell of the dry type comprising a cathode, an electrolyte and an aluminum base alloy container as the anode, said alloy containing at least 90 percent aluminum and between 0.01 and 0.5 percent tin wherein the tin is retained in solid solution in an amount from 0.01 to 0.06 percent.

2. A primary cell of the dry type comprising a cathode, a cathodic depolarizer, an electrolyte and an aluminum base alloy container as the anode, said alloy containing at least 90 percent aluminum and between 0.01 and 0.05 percent tin wherein the tin is retained in solid solution in an amount from 0.01 to 0.06 percent.

3. A primary cell according to claim 1 wherein said alloy contains at least 95 percent aluminum and wherein the tin is retained in solid solution in an amount from 0.02 to 0.05 percent.

4. A primary cell according to claim 1 wherein said alloy contains between 0.001 and 0.05 percent silicon and between 0.001 and 0.1 percent iron.

5. A primary cell according to claim 1 wherein said alloy contains from 0.005 to 4 percent of a lattice contractor which has greater than 0.03 percent solid solubility in aluminum, said lattice contractor being selected from the group consisting of zinc, copper, silicon, manganese, silver and mixtures thereof.

6. A primary cell of the dry type comprising a carbon cathode, manganese dioxide cathodic depolarizer, a chloride paste electrolyte and an aluminum base alloy container as the anode, said alloy containing at least 90 percent aluminum, and between 0.01 and 0.05 percent tin, wherein the tin is retained in solid solution in an amount from 0.01 to 0.06 percent.

7. A primary cell according to claim 6 wherein said alloy contains at least 95 percent aluminum and wherein the tin is retained in solid solution in an amount from 0.02 to 0.05 percent.

8. A primary cell according to claim 6 wherein said alloy contains from 0.005 to 4 percent of a lattice contractor which has greater than 0.03 percent solid solubility in aluminum, said lattice contractor being selected from the group consisting of zinc, copper, silicon, manganese, silver and mixtures thereof.

References Cited by the Examiner

UNITED STATES PATENTS

| | | | |
|---|---|---|---|
| 2,554,447 | 5/1951 | Sargent | 136—100 |
| 2,565,544 | 8/1951 | Brown | 204—197 X |
| 2,801,917 | 8/1957 | Buttner et al. | 75—138 |
| 2,838,591 | 6/1958 | Stokes | 136—100 |
| 2,913,384 | 11/1959 | Staley | 204—197 X |
| 3,063,832 | 11/1962 | Snyder | 75—138 |

ALLEN B. CURTIS, *Primary Examiner.*

JOHN H. MACK, WINSTON A. DOUGLAS, *Examiners.*

B. J. OHLENDORF, *Assistant Examiner.*